Jan. 18, 1949.  M. FLETCHER  2,459,692
SUPPORT FOR NEON TUBES
Filed Dec. 21, 1944

INVENTOR
Milton Fletcher
BY
ATTORNEY

Patented Jan. 18, 1949

2,459,692

UNITED STATES PATENT OFFICE 2,459,692

SUPPORT FOR NEON TUBES

Milton Fletcher, New York, N. Y.

Application December 21, 1944, Serial No. 569,207

2 Claims. (Cl. 248—50)

This invention relates to new and useful improvements in a support for neon tubes.

The invention has for an object the construction of a support which is made from a single piece of sheet metal and which is formed with a flat lug portion by which it may be fastened to a base, and a cylindrical portion associated with the lug portion in a certain way and arranged to support the lower end of the glass rod generally used to support neon tubes.

More specifically the invention proposes to form the cylindrical portion by forming it as a continuation from the flat lug portion, and it is proposed to arrange this cylindrical portion with a split along the longitudinal side which is opposed to the lug portion. Furthermore it is contemplated to construct this split with projections formed with outwardly extending offset ends by which the projections may be gripped and pressed together to resiliently open the cylindrical portion a small amount to release the glass rod.

Still further the invention proposes to construct the cylindrical portion and glass rod in a certain way, so as to facilitate the gripping of these parts when the rod is slightly turned after it is in position upon the said support.

Still further the invention proposes the construction of a device as mentioned which is simple and durable and which may be manufactured and sold at a reasonable cost.

A still further object of the invention is to construct the cylindrical portion in adjustable relation with the lug portion to accommodate glass rods of various heights.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
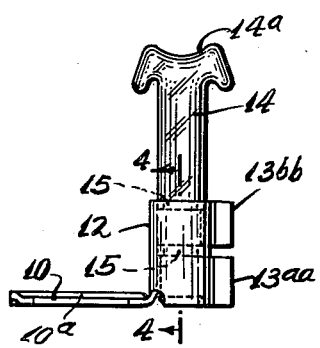
Fig. 1 is a side elevational view of a support for neon tubes constructed in accordance with this invention.
Figure 2:
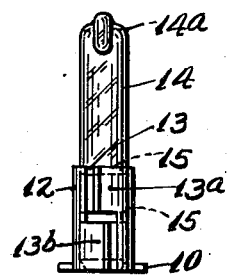
Fig. 2 is an end elevational view looking from the right hand side of Fig. 1.
Figure 4:
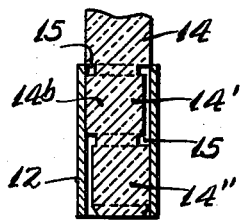
Fig. 4 is a fragmentary enlarged vertical sectional view taken on the line 4—4 of Fig. 1.

The support for neon tubes, in accordance with this invention, includes a single piece of sheet metal having a flat lug portion 10 formed with reinforcing ribs 10ª and an opening 11 for a fastening element not shown on the drawing, to attach the support to a base. The lug portion 10 continues into one side of the bottom edge of a cylindrical portion 12. This cylindrical portion has its axis at right angles to the plane of the lug 10.

The cylindrical portion 12 is also formed with a slit 13 extending longitudinally along the side which is remote from the lug portion 10. This slit portion 13 is arranged so that the material at the sides of it, has top and bottom portions 13ª and 13ᵇ, respectively, which continue into overlapping projecting portons formed with offset ends 13ᵃᵃ and 13ᵇᵇ, respectively, by which the projecting portions may be pressed together so as to slightly open up the tubular formation of the tubular portion 12.

Figures 3, 5:
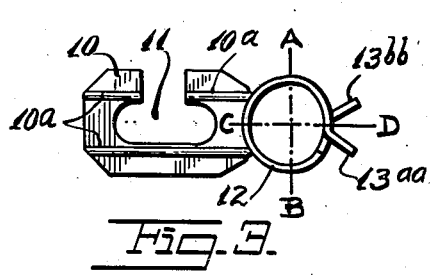
Fig. 3 is an enlarged plan view of the metal portion of the support.
Fig. 5 is a bottom view of the glass rod used in the support.

A rod 14 having a head portion 14ª to which a neon tube is to be secured, and a bottom portion 14ᵇ, is associated with the cylindrical portion 12 in a particular way. More specifically the cylindrical portion 12 is not truly cylindrical but somewhat elliptical. This may be noted from carefully inspecting Fig. 3 and noting that it is wider at the major axis indicated by the letters A and B, while it is somewhat narrower along the minor axis indicated by the letters C and D.

The bottom portion of the rod 14 is formed with several sections separated from each other by peripheral grooves 15. There is a second 14' which while truely circular, is of a slightly smaller diameter than the upper portion of the rod, and offset diametrically opposite of the section 14''. Consequently, in end elevational view the sections 14' and 14'' simulate an elliptical form, see Fig. 5, in which the major axis extends across the direction of the offset of the sections and the minor axis at right angles to this direction.

The lower portion of the rod 14 may be turned so that the major axis at its bottom end is in the same direction as the major axis of the cylindrical portion 12. Then by applying slight pressure to squeeze together the projecting ends 13ᵃᵃ and 13ᵇᵇ, the cylindrical portion may be slightly sprung and then the bottom end of the rod 14 engaged therein. The projections 13ᵃᵃ and 13ᵇᵇ may then be released so that the cylindrical portion 12 grips the lower portion of the rod 14. Then the rod 14 may be turned through 90 degrees, by gripping it at its end 14ᵃ. This will cause the major axis with the bottom end of the rod to align with the minor axis of the cylindrical portion 12. The result will be that there will be extra gripping pressure by which the cylindrical portion grips and supports the rod 14.

Figure 6:
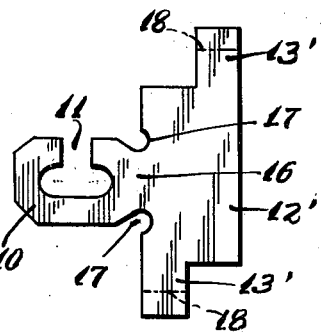
Fig. 6 is a developed view of the metal portion of the support.

In Fig. 6 a developed view has been shown of the blank used in forming the metal portion of the support. This blank includes a flat lug portion 10 having an opening 11, which in the finished product forms the lugs portion of the device. This lug portion 11 is connected by a throat area 16 to the main body 12' of the blank which in the finished product forms the cylindrical portion. At the sides of the throat portion 16, there are cutaway areas 17 for the purpose of facilitating bending of the blank at the throat area. The ends of the blank are formed with projecting portions 13' which in the finished article form the projections 13ᵃ and 13ᵇ. The dot and dash lines 18 indicate where the ends 13' are bent to form the offset end portions 13ᵃᵃ and 13ᵇᵇ.

Figure 8:
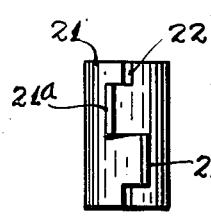
Fig. 8 is an end elevational view of Fig. 7.
Figure 7:
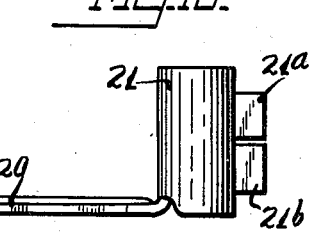
Fig. 7 is a side elevational view of a support for neon tubes constructed in accordance with another embodiment of this invention.

In the embodiment of the invention illustrated in Figs. 7 and 8, a support for neon tubes has been illustrated which is formed from a single piece of sheet metal and which includes a flat lug portion 20 by which it may be secured to a support or base, and the lug portion 20 continues into one side of the bottom edge of a cylindrical portion 21. This cylindrical portion has its axis at right angles to the plane of the lug portion 20.

The cylindrical portion 21 is formed with a slit 26 extending longitudinally along the side remote from the lug portion 20. This slit 26 is arranged so that the material at the sides of it have top and bottom offset portions 21a and 21b, respectively, set in short distances in the top and bottom edges of the cylindrical portion. These portions 21ᵃ and 21ᵇ are offset relative to each other in a way so that they may be forced towards each other by engaging one thumb and forefinger against these parts and applying pressure.

In other respects this form of the invention is identical to the prior form and the same parts may be recognized by the same reference numerals.

Figure 10:
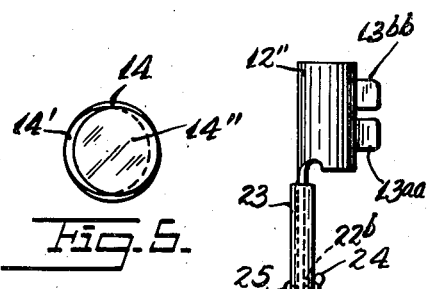
Fig. 10 is a similar view to Fig. 7, but illustrating a further modification of the invention.
Figure 12:
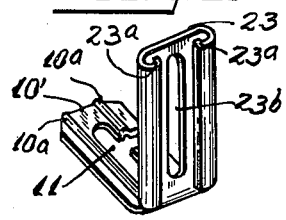
Figs. 11 and 12 are perspective views of parts shown in Fig. 10.
Figures 9, 11:
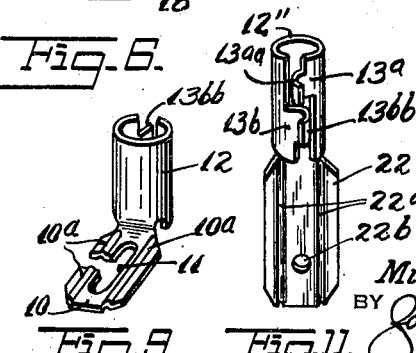
Fig. 9 is a perspective view of the support.

In Figs. 10, 11 and 12, a cylindrical portion 12'' is shown with a vertical extension 22 which is adapted to slide in a channel shape base member 23 so that the grooves 22ª formed in the vertical extension 22 are engaged by the inturned flanges 23ª of the channel shape member 23.

The extension 22 may be raised to any desired height with relation to member 23 and secured in position by a nut 24 which engages the threaded portion of bolt 25. This bolt 25 passes through a circular opening 22ᵇ in the extension 22 and through a vertical slot 23ᵇ in the member 23.

The member 23 is provided with a flat lug portion 10' similar to that shown in the previous figures.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An article of the class described, comprising a clip of resilient material including a cylindrical portion formed along one side with a longitudinal split so that the cylindrical portion may be expanded to permit the insertion and removal of one end portion of a rod, said cylindrical portion being elliptical in cross-section, and a rod having an end portion engaged in said cylindrical portion, said end portion engaged within said cylindrical portion being formed with spaced circumferential grooves dividing said end portion into sections, one of said sections being offset laterally in one direction and the other being offset laterally in the opposite direction to combine to give said end portion an elliptical configuration conforming to the elliptical cross-sectional shape of said cylindrical portion, whereby said end portion of said rod is inserted into said cylindrical portion with the major axis of its elliptical formation parallel to the major axis of the elliptical cylindrical portion after which said rod is turned through ninety degrees to extend the major axis of the elliptical formation of said end portion parallel to the minor axis of the cylindrical portion to be more rigidly gripped by said cylindrical portion.

2. An article of the class described, comprising a clip of resilient material including an elongated lug provided with strengthening ribs and an opening for a fastening means, a cylindrical portion formed perpendicularly to one end of said lug, said cylindrical portion formed along one side thereof with a longitudinal slit so that the cylindrical portion may be expanded to permit the insertion and removal of one end portion of a rod, extended edges along the edges defining the slit to facilitate expansion of the cylindrical portion, said cylindrical portion being elliptical in cross section, and a rod having an end portion thereof engaged in said cylindrical portion, said rod end portion engaged within said cylindrical portion being formed with spaced circumferential grooves dividing said end portion into longitudinally spaced sections, one of said sections being offset laterally in one direction and the other section being offset laterally in the opposite direction to combine to give said end portion an overall elliptical configuration conforming to the elliptical shape of said cylindrical clip portion, whereby said end portion of said rod is inserted into said cylindrical portion with the major axis of its elliptical formation parallel to the major axis of the elliptical cylindrical portion after which said rod is turned through 90° to extend the major axis of the elliptical portion of said rod end portion parallel to the minor axis of the elliptical cylindrical portion to be more rigidly gripped by said cylindrical portion.

MILTON FLETCHER.

REFERENCES CITED

The following references are of record in the file of this patent:

UNITED STATES PATENTS

| Number | Name | Date |
| --- | --- | --- |
| 1,402,463 | Wilson | Jan. 3, 1922 |
| 1,998,296 | Walker | Apr. 16, 1935 |
| 2,145,169 | Fletcher | Jan. 24, 1939 |
| 2,164,264 | Waterman | June 27, 1939 |
| 2,308,699 | Longenecker | Jan. 19, 1943 |